United States Patent [19]
Lew

[11] Patent Number: 4,749,447
[45] Date of Patent: * Jun. 7, 1988

[54] EVACUATED EVAPORATION-PRESSURIZED CONDENSATION SOLAR STILL

[76] Inventor: Hyok S. Lew, 7890 Oak St., Arvada, Colo. 80005

[*] Notice: The portion of the term of this patent subsequent to Jul. 14, 2004 has been disclaimed.

[21] Appl. No.: 866,892

[22] Filed: May 27, 1986

Related U.S. Application Data

[63] Continuation-in-part of Ser. No. 721,655, Apr. 10, 1985, Pat. No. 4,680,090, and a continuation-in-part of Ser. No. 647,365, Sep. 4, 1984, abandoned, and a continuation-in-part of Ser. No. 492,445, May 6, 1983, Pat. No. 4,639,293.

[51] Int. Cl.⁴ .................... B01D 3/04; B01D 1/28; C02F 1/14
[52] U.S. Cl. .................... 202/177; 202/187; 202/205; 202/233; 202/234; 202/241; 126/435; 126/442; 159/903; 165/95; 203/22; 203/26; 203/4; 203/DIG. 1
[58] Field of Search .............. 202/234, 233, 235, 177, 202/187, 180, 205, 237, 241; 203/DIG. 1, 4, 26, 22, 99, 91, 7; 159/903, 24.2, DIG. 13, DIG. 16; 165/95; 126/435, 442

[56] References Cited

U.S. PATENT DOCUMENTS

| | | | |
|---|---|---|---|
| 1,258,405 | 3/1918 | Harrison | 126/438 |
| 1,966,938 | 7/1934 | Stone | 203/11 |
| 2,902,028 | 9/1959 | Manly | 202/234 |
| 3,284,318 | 11/1966 | Coanda et al. | 203/26 |
| 3,461,041 | 8/1969 | Snyder | 203/26 |
| 3,707,442 | 12/1972 | Takahashi et al. | 202/173 |
| 3,785,931 | 1/1974 | Coffey et al. | 202/234 |
| 3,875,926 | 4/1975 | Frank | 202/234 |
| 4,011,855 | 3/1977 | Eshelman | 126/441 |
| 4,366,855 | 1/1983 | Spitz | 165/95 |
| 4,487,659 | 12/1984 | Stark | 202/173 |
| 4,492,186 | 1/1985 | Helm | 165/95 |

*Primary Examiner*—Wilbur Bascomb

[57] ABSTRACT

This invention discloses a solar still comprising a plurality of twin conduits routed through a plurality of solar collectors wherein the liquid is evaporated in the evaporation conduit constituting the first of the twin conduits and the vapor is condensed in the condensation conduit constituting the second conduit of the twin conduits. The evaporation conduit and the condensation conduit are separated from one another by a heat conducting element. A plurality of vapor conduits branching off from the evaporation conduits are connected to the condensation conduits via at least one pump or blower. The liquid fed to the evaporation conduit evaporates to vapor under an evacuated state provided by the pump or blower after being heated by the solar energy collected and supplied by the solar collector and/or by the latent heat released in and supplied by the condensation conduit wherein the vapor is condensed to liquid under a pressurized state provided by the pump or blower. The latent heat is recycled conductively via the heat conducting element separating the twin conduits from one another as the latent heat released by the condensing vapor under a pressurized state in the condensation conduit at a higher temperature flows from the condensation conduit to the evaporation conduit wherein the liquid evaporates under an evacuated state at a lower temperature.

20 Claims, 2 Drawing Sheets

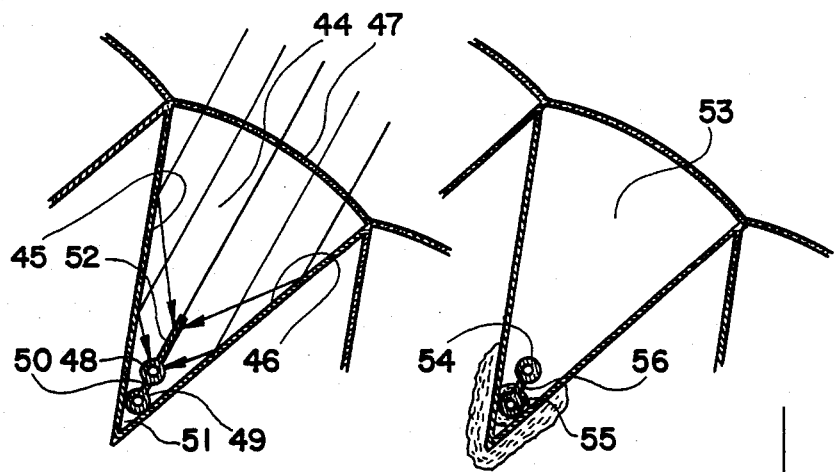
Fig. 2
Fig. 3
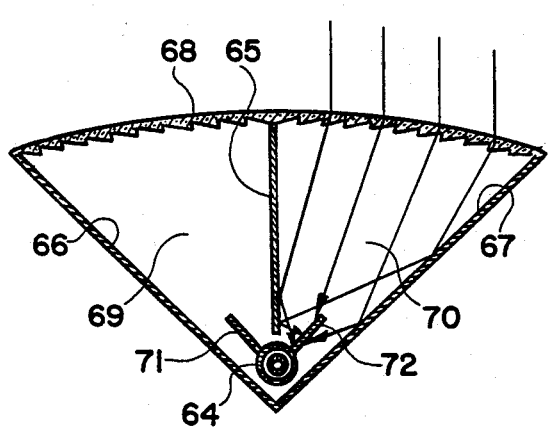
Fig. 5
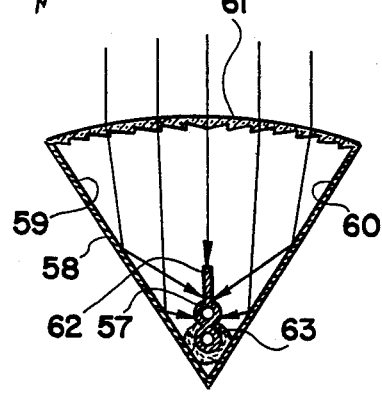
Fig. 4
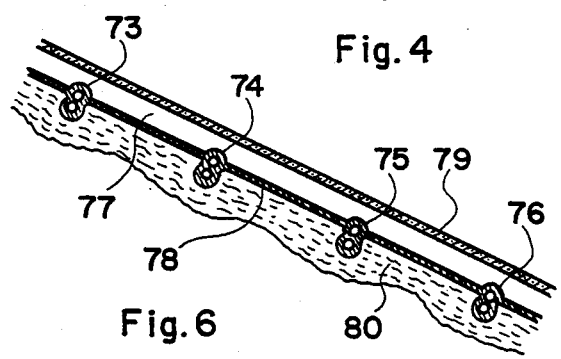
Fig. 6
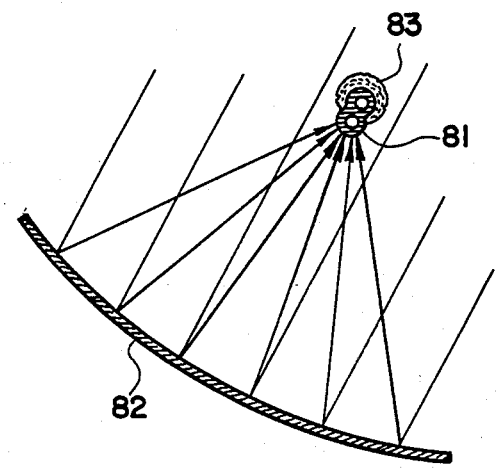
Fig. 7
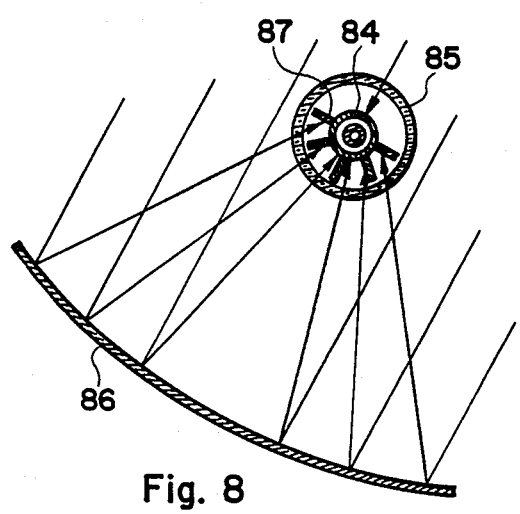
Fig. 8

EVACUATED EVAPORATION-PRESSURIZED CONDENSATION SOLAR STILL

This patent application is a continuation-in-part application to Ser. No. 492,445 entitled "Partially Evacuated Solar Still" filed on May 6, 1983 which is now U.S. Pat. No. 4,639,293; to Ser. No. 647,365 entitled "Evacuated Evaporation-Pressurized Condensation Solar Still" filed on Sept. 4, 1984 and now abandoned and to Ser. No. 721,655 entitled "Direct Heat Recycling Regenerative Still" filed on Apr. 10, 1985 which is now U.S. Pat. No. 4,680,090.

BACKGROUND OF THE INVENTION

With few exceptions the solar still technology practiced at the present time employs one or another version of the solar pond, which does not satisfy the requirements dictated by the mobile and fast paced life style of the twenty first century. The solar pond requires permanent installation and construction of bulky, heavy and expensive facility. The solar pond is an wasteful device in terms of the solar energy utilization, because the heat released by the condensing vapor is thrown away to the ambient atmosphere. The solar pond becomes an extremely inefficient apparatus when the ambient temperature falls below a certain point. The output of the solar pond constructed per modern day technology diminishes to one seventh in the winter season compared with the summer season while the actual amount of the total solar radiation available in the summer is no greater than twice that of winter.

SUMMARY OF THE INVENTION

The primary object of the present invention is to provide a solar still wherein the evaporation of the liquid heated by the solar energy collected by and supplied from the solar collector takes place under an evacuated state in the evaporation conduit provided by a pump or blower and the vapor transported from the evaporation conduit to the condensation conduit by the pump or blower condenses under a pressurized state provided by the pump or blower.

Another object is to reuse the latent heat released by the condensing vapor in the condensation conduit for the evaporation of the liquid in the evaporation conduit.

A further object is to transfer the latent heat released in the condensation conduit at a higher temperature to the evaporation conduit wherein the liquid evaporates at a lower temperature by the heat conduction through the heat conducting element thermally connecting the evaporation conduit and the condensation conduit to one another.

Still another object is to include a pump or blower that actively transports the vapor from the evaporation conduite to the condensation conduit, whereby the pump or blower creates an evacuated state in the evaporation conduit and a pressurized state in the condensation conduit.

Still a further object is to provide a solar still wherein the liquid is fed to the evaporation conduit in a controlled manner.

Yet another object is to provide a solar still wherein the residual liquid in the evaporation conduit is purged in a controlled manner.

Yet a further object is to provide a solar still wherein the condensate in the condensation conduit is collected in a controlled manner.

Additionally another object is to provide a solar still including means for blast-cleaning the evaporation conduits and the condensation conduits.

Additionally a further object is to provide a solar still having a high output per unit area of the solar collector. These and other objects of the present invention will become clear as the description thereof proceeds.

BRIEF DESCRIPTION OF THE FIGURES

The present invention may be described with greater clarity and specificity by referring to the following figures:

FIG. 2 illustrates an embodiment for the twin conduit comprising the evaporation conduit and the condensation conduit routed through a solar collector in a parallel relationship.

FIG. 3 illustrates another embodiment of the twin conduit routed through a solar collector.

FIG. 4 illustrates a further embodiment of the twin conduit routed through another type of solar collector.

FIG. 5 illustrates yet another emobdiment of the twin conduit routed through a solar collector.

FIG. 6 illustrates yet a further embodiment of the twin conduit routed through a solar collector.

FIG. 7 illustrates still another embodiment of the twin conduit routed parallel to a solar collector.

FIG. 8 illustrates still a further embodiment of the twin conduit routed parallel to a solar collector.

DESCRIPTION OF THE ILLUSTRATED EMBODIMENTS

Figure 1:
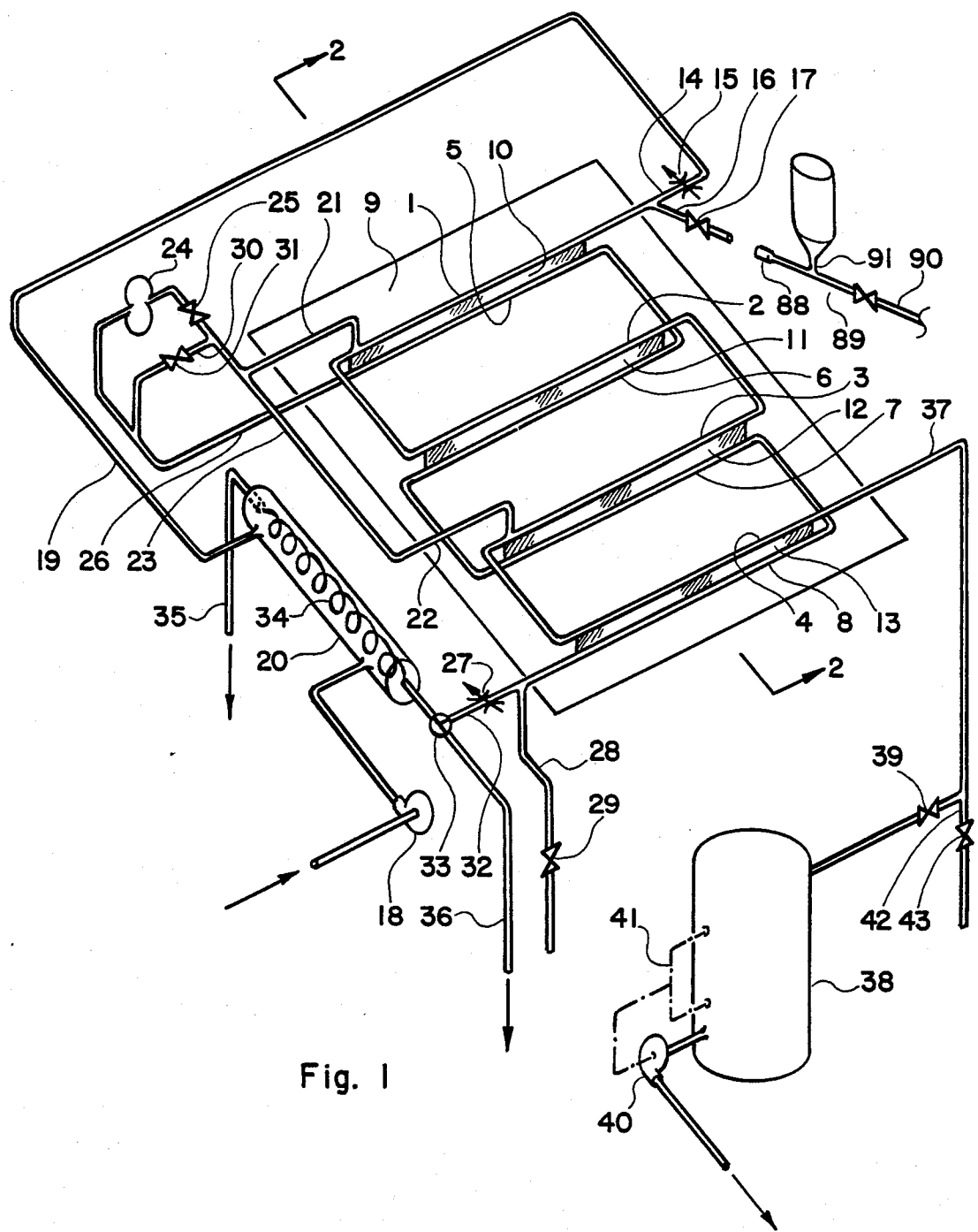
FIG. 1 illustrates a schematic diagram showing a perspective view of an arrangement of the present invention.

In FIG. 1 there is illustrated a schematic diagram showing a perspective view of an embodiment of the "Evacuated Evaporation-Pressurized Condensation Solar Still" arranged in accordance with the principles of the present invention. The evaporator conduits 1, 2, 3, 4, etc. and the condenser conduits 5, 6, 7, 8, etc. are routed through the solar collector of next to one another in a parallel relationship and connected to one another by the heat conductor fins 10, 11, 12, 13, etc. The inlet extremity 14 of the evaporator conduits includes an orifice 15 and a cleaning fitting 16 equipped with a shut off valve 17, wherein the cleaning fitting 16 merges to the evaporator conduit 1 at a downstream point of the inlet orifice 15. The raw liquid is fed into the evaporator conduits by a feed pump 18 that pumps the row liquid into the evaporator conduits through the raw liquid supply conduit 19 including a heat exchanger 20. Of course, the raw liquid may be fed into the evaporator conduit by gravity from an elevated raw liquid tank. The inclusion of the heat exchanger 20 is an option as the solar still of the present invention works with or without the heat exchanger 20. The vapor is collected from the evaporator conduits through the vapor conduits 21, 22, etc. branching off from the evaporator conduits in a substantially vertical direction and forming a manifold conduit 23, which is connected to the inlet of a fluid moving device 24 such as a vacuum-pressure pump or blower. The shut off valve 25 is included intermediate the manifold conduit 23 and the fluid moving device 24. The outlet of the fluid moving means 24 is connected to the inlet extremity 26 of the condenser conduit 26. An outlet orifice 27 is included in the condenser conduit at the discharge end thereof. The cleaning fitting 28 equipped with a shut-off valve 29 branches off from the condenser conduit at an upstream point of the outlet orifice 27. The by-pass conduit 30 including a shut off valve 31 connects the manifold conduit 23 and the condenser conduit, by-passing the combination of the shut off valve 25 and fluid moving means 24. The outlet extremity 32 of the condenser conduit includes a three-way valve 33 that directs the distilled liquid either to the conduit 34 routed through the heat exchanger 20 wherein the distilled liquid is discharged through the warm liquid conduit 35, or to the hot liquid conduit 36 by-passing the heat exchanger 20. The discharge extremity 37 of the evaporator conduit is connected to the reject liquid purge tank 38 through a shut off valve 39. The reject liquid purge tank 38 includes means for discharging the reject liquid without breaking an evacuated state existing in the evaporator conduit, which means may include a pump 40 controlled by a level switch 41. The cleaning fitting 42 including a shut-off valve 43 is connected to the discharge extremity of the evaporator conduit at an upstream point of the shut off valve 39.

The evacuated evaporation-pressurized condensation solar still illustrated in FIG. 1 operates in the following principles and modes: The raw liquid such as sea water is pumped into the system by the raw liquid feed pump 18 wherein the raw liquid moves throh the heat exchanger 20, the inlet orifice 15 and into the evaporator conduits 1, 2, 3, 4, etc. The feed pump 18 may be controlled by a flowmeter measuring the amount of flow of the reject liquid flowing into the purge tank 38 or by other control inputs indicating the rate of evaporation taking place in the evaporator conduit. As a matter of fact, a gravity feed from an elevated raw liquid tank controlled by a variable inlet orifice 15 may be used in place of the feed pump 18 in feeding the raw water into the evaporator conduits. The evaporator conduits routed through the solar collector 9 are provided with a small amount of continuous down slope and, consequently, the raw water fed into the evaporator conduits under a controlled rate flows down through the evaporator conduits only partially filling the cross section of the evaporator conduits. The raw liquid flowing along the bottom of the evaporator conduits at a very slow speed becomes evaporated by the heat supplied from the sunlight collected and delivered by the solar collector 9 as well as by the partial vacuum created by the fluid moving means 24 such as a pump or blower. The residual raw liquid in the evaporator conduits flows into the purge tank 38 wherein it is collected and periodically discharged by the purge pump 40 without breaking an evacuated state existing in the evaporator conduits. A gravity leg of sizable length disposed vertically and connected to the outlet extremity 37 of the evaporator conduits may be employed in place of the combination including the purge tank 38 and purge pump 40 in purging the residual raw liquid without breaking the evacuated state existing in the evaporator conduits. The arrangement and operating principles of the gravity leg purging system is described in U.S. Pat. No. 4,639,293 entitled "Partially Evacuated Solar Still". The vapor produced in the evaporator conduits 1, 2, 3, 4, etc. is collected through the vapor conduits 21, 22, etc. vertically branching off therefrom, which vapor is, then, compressed and forced into the condenser conduits 5, 6, 7, 8, etc. by the fluid moving means 24 such as a pump or blower. The latent heat released by the condensing vapor under compression in the condenser conduits is transferred to the evaporator conduits through the heat conducting fins 10, 11, 12, 13, etc., as the condensation of the vapor in the condenser conduit takes place at a higher temperature than the evaporation of the raw liquid in the evaporator conduits due to the fluid moving means 24 creating an evacuated state in the condenser conduit and a pressurized state in the condenser conduit. As a consequence, the heat released by the condensing vapor in the condenser conduits is recycled back to the evaporator conduits wherein it is used in addition to the heat supplied by the solar collector 9 to evaporate more raw liquid. If there is no thermal or mechanical energy loss in the system, the evaporated evaporation-pressurized condensation solar still illustrated in FIG. 1 should work perpetually once it is started without requiring any additional energy input from sunlight. Of course, there are mechanical and thermal energy leaks out of solar still system, and, consequently, the solar still shown in FIG. 1 does not attain the status of a perpetual machine. The distilled liquid produced in the condenser conduits 5, 6, 7, 8, etc. flows out of the condenser conduits through the outlet orifice 27 that plays the role of a pressure choke in maintaining the pressurized state in the condenser conduits. The distilled liquid emerging from the condenser conduits is directed either to the hot liquid conduit 36 or to the warm liquid conduit 35 by the three-way valve 33. The hot distilled liquid directed to the warm liquid conduit 35 flows through the heat exchanger 20 wherein it preheats the raw liquid being fed into the evaporator conduits and becomes warm distilled liquid. It should be understood that the evaporator conduit and the condenser conduit may be a twin conduit extruded in an integral structure or welded to one another directly, which is routed through the solar collector. Various designs and constructions of the twin conduit usable in conjunction with the solar still of the present invention are illustrated in FIGS. 2 through 8. The cleaning fittings 16, 28, 42 and the by-pass conduits 30 are for blast cleaning the evaporator conduits and the condenser conduits by a high speed air flow carrying abrasive particles, that is provided by the blast cleaning equipment connected to one of the cleaning fittings wherein the other cleaning fittings provide exits for the blast cleaning air streams. The nozzle 88 of the blast cleaning equipment 89 comprising a compressed air or high pressure steam supply line 90 and the solid or liquid particle supply line 91 connects to the cleaning fitting 16 during a blast cleaning operation. In a large installation, the cleaning fittings equipped with three way valves having a vent port may be permanently connected to a centralized blast cleaning unit.

In FIG. 2 there is illustrated a cross section of the twin conduit comprising the evaporator conduit and the condenser conduit routed through the solar collector, which cross section is taken along plane 2—2 as shown in FIG. 1. The solar collector used in conjunction with the solar still may be a light funnel 44 comprising a pair of light reflecting surfaces 45 and 46 arranged in a substantially V-shaped cross section. The top opening of the light funnel 44 is covered by a transparent cover 47. The twin conduit comprising an evaporator conduit 48 representing the evaporator conduits 1, 2, 3, 4, etc. shown in FIG. 1, and a condenser conduit 49 representing the condenser conduits 5, 6, 7, 8, etc. interconnected by a heat conducting fin 50, is routed adjacent and parallel to the apex line 51 of the light funnel 44. The heat absorbing fin 52 extending from the evaporator conduit 48 roughly divides the wedge angle between the two light reflecting surfaces into two equal halves. In general the wedge angle of the light funnel should be less than 35 degrees in order to funnel the sun light entering through the top opening 47 to the twin conduit. It is self-evident that the walls of the evaporator conduit 48 and the condenser conduit 49 may be in contact directly wherein the heat absorbing fin 50 is eliminated. The surface of the heat absorbing fin and the twin conduit may be coated with a black coating to enhance the absorption of the sun light.

In FIG. 3, there is shown another embodiment of the twin conduit routed through a light funneling solar collector 53, which is arranged in essentially the same way as the combination shown in FIG. 2 with a few exceptions. The twin conduit includes the evaporator conduit 54 and the condenser conduit 55 connected to one another by the heat conducting-absorbing fin 56. The condenser conduit 55 as well as the apex zone of the light funnel 53 is insulated.

In FIG. 4, there is shown a further embodiment of the twin conduit 57 having a construction similar to that shown in FIG. 2, routed through another type of light funneling solar collector 58, that includes a light funnel 58 comprising a pair of light reflecting surfaces 59 and 60 arranged in a substantially V-shaped cross section, wherein the top opening is covered by a two dimensional Fresnel lens 61. The sunlight entering the light funnel 58 is initially refracted by the Fresnel lens 61 in a general direction towards the apex zone of the light funnel, and is then funneled to the twin conduit 57 by the light funnel wherein the concentrated sun light is absorbed by the heat absorbing fin 62 extending from the twin conduit 57. The condenser conduit of the twin conduit is insulated by a thermally insulating material 63.

In FIG. 5, there is illustrated yet another embodiment of the twin conduit 64 including an evaporator conduit and a condenser conduit disposed coaxially within the evaporator conduit, that is routed in a solar funnel comprising a pair of one-sided light reflecting surfaces 66 and 67 arranged in a substantially V-shaped cross section and a two-dimensional Fresnel lens 68 covering the top opening. The light funnel further includes a dual sided light reflecting surface 65 dividing the light funnel into the two sub-light funnels 69 and 70. The sun light concentrated by the Fresnel lens 68 and the two sub-light funnels 69 and 70 are absorbed by the heat absorbing fins 71 and 72 radially extending from the twin tubing 64, respectively. In this particular embodiment, the latent heat released by the condensing vapor in the condenser conduit is completely absorbed by the evaporating liquid in the evaporator conduit as the latent heat can not escape to the ambient surroundings without crossing the wall of the evaporator conduit.

In FIG. 6, there is illustrated yet a further embodiment of the twin tubings 73, 74, 75, 76, etc. heated by a flat solar collector 77. The twin conduits respectively comprising an evaporator conduit and a condenser conduit constructed in a side-by-side arrangement are attached to a heat absorbing plate 78 of the flat solar collector which is covered with a transparent plate 79 disposed parallel thereto with a space therebetween. One side of the heat absorbing plate 78 opposite to the transparent plate 79 is covered with a thermally insulating material 80.

In FIG. 7, there is illustrated still another embodiment of the twin conduit 81 that is heated by a parabolic trough solar collector 82. The condenser conduit included in the twin conduit 81 may be insulated by a thermally insulating material 83.

In FIG. 8, there is illustrated still a further embodiment of the twin conduit enclosed within an evacuated transparent tubing 85, that is heated by a parabolic trough collector 86. The twin conduit 84 includes an evaporator conduit with a wall having a plurality of heat absorbing fins 87 extending radially therefrom, and a condenser conduit coaxially disposed within the evaporator conduit.

The combination of the twin conduit comprising the evaporator conduit and the condenser conduit, and the solar collector may be arranged in many different combinations. The illustrative illustrations shown in FIGS. 2 through 8 merely exemplify a few of many possible combinations. Therefore, the scope of the present invention is not limited to those illustrated embodiments.

While the principles of the present invention have now been made clear by the illustrative embodiments, there will be immediately obvious to those skilled in the art many modifications of the structures, arrangements, proportions, elements and materials, which are particularly adapted to the specific working environments and operating conditions in the practice of the invention without departing from those principles of the present invention.

I claim:

1. A distillation apparatus comprising in combination:
   (a) at least one solar collector including means for collecting solar energy and at least one combination of conduits absorbing the solar energy collected by said means, wherein said means for collecting the solar energy and said combination of conduits absorbing the solar energy are integral elements of said solar collector;
   (b) at least one evaporator conduit and at least one condenser conduit included in said combination of conduits in a parallel arrangement therebetween, wherein said combination of the evaporator and condenser conduits includes means for providing conductive heat transfer therebetween;
   (c) at least one vapor header branching off from said evaporator conduit and connected to said condenser conduit tor moving vapor from said evaporator conduit to said condenser conduit;
   (d) at least one fluid moving means included in said vapor header intermediate said evaporator conduit and said condenser conduit for forcibly moving vapor from said evaporator conduit to said condenser conduit, wherein said fluid moving means creates an evacuated state in said evaporator conduit and a pressurized state in said condenser conduit;
   (e) means for supplying raw fluid to said evaporator conduit at a controlled rate; and
   (f) means for recovering condensate from said condenser conduit;

whereby, raw fluid supplied to said evaporator conduit and heated by the thermal energy supplied to said evaporator conduit evaporates under an evacuated state and vapor forcibly moved from said evaporator conduit to said condenser conduit by said fluid moving means condenses under a pressurized state wherein latent heat released by the condensing vapor in said condenser conduit is conductively transferred to said evaporator conduit for evaporating more raw fluid in said evaporator conduit.

2. The combination as set forth in claim 1 wherein said combination includes at least one blast cleaning fitting for connecting a blast cleaning apparatus to said combination of conduits, whereby the blast cleaning apparatus cleans said combination of conduits when the blast cleaning apparatus is activated.

3. The combination as set forth in claim 1 wherein said combination includes a heat exchanger that transfers thermal energy from the condensate emerging from said condenser conduit to the raw fluid being supplied to said evaporator conduit.

4. The combination as set forth in claim 1 wherein said evaporator conduit and said condenser conduit are connected to one another by at least one heat conducting fin.

5. The combination as set forth in claim 4 wherein said condenser conduit is insulated against heat loss to the ambient surrounding.

6. The combination as set forth in claim 1 wherein said evaporator conduit and said condenser conduit are separated from one another by a common wall.

7. The combination as set forth in claim 6 wherein said condenser conduit is insulated against heat loss to the ambient surrounding.

8. The combination as set forth in claim 1 wherein said condenser conduit is enclosed within said evaporator conduit in a conduit-in-conduit construction.

9. The combination as set forth in claim 1 wherein said combination of the evaporator conduit and the condenser conduit is enclosed within a transparent tubing.

10. The combination as set forth in claim 9 wherein the interior of said transparent tubing is evacuated.

11. A distillation apparatus comprising in combination:
(a) at least one solar collector including means for collecting solar energy in a concentrating mode and directing the concentrated solar energy to at least one combination of conduits absorbing the concentrated solar energy, wherein said means for collecting the solar energy and said combination of conduits absorbing the solar energy are integral elements of said solar collector;
(b) at least one evaporator conduit and at least one condenser conduit included in said combination of conduits in a parallel arrangement therebetween, wherein said combination of the evaporator and condenser conduits includes means for providing condutive heat transfer therebetween,
(c) at least one vapor header branching off from said evaporator conduit and connected to said condenser conduit for moving vapor from said evaporator conduit to said condenser conduit;
(d) at least one fluid moving means included in said vapor header intermediate said evaporator conduit and said condenser conduit for forcibly moving vapor from said evaporator conduit to said condenser conduit, wherein said fluid moving means creates an evacuated state in said evaporator conduit and a pressurized state in said condenser conduit;
(e) means for supplying raw fluid to said evaporator conduit at a controlled rate; and
(f) means for recovering condensate from said condenser conduit;
whereby, raw fluid supplied to said evaporator conduit and heated by the thermal energy supplied to said evaporator conduit evaporates under an evacuated state and vapor forcibly moved from said evaporator conduit to said condenser conduit by said fluid moving means condenses under a pressurized state wherein latent heat released by the condensing vapor in said condenser conduit is condutively transferred to said evaporator conduit for evaporating more raw fluid in said evaporator conduit.

12. The combination as set forth in claim 11 wherein said combination includes at least one blast cleaning fitting for connecting a blast-cleaning apparatus to said combination of conduits, whereby the blast cleaning apparatus cleans said combination of conduits when the blast cleaning apparatus is activated.

13. The combination as set forth in claim 11 wherein said combination includes a heat exchanger that transfers thermal energy from the condensate emerging from said condenser conduit to the raw fluid being supplied to said evaporator conduit.

14. The combination as set forth in claim 11 wherein said evaporator conduit and said condenser conduit are connected to one another by at least one heat conducting fin.

15. The combination as set forth in claim 14 wherein said condenser conduit is insulated against heat loss to the ambient surrounding.

16. The combination as set forth in claim 11 wherein said evaporator conduit and said condenser conduit are separated from one another by a common wall.

17. The combination as set forth in claim 16 wherein said condenser conduit is insulated against heat loss to the ambient surrounding.

18. The combination as set forth in claim 11 wherein said condenser conduit is enclosed within said evaporator conduit in a conduit-in-conduit construction.

19. The combination as set forth in claim 11 wherein said combination of the evaporator conduit and the condenser conduit is enclosed within a transparent tubing.

20. The combination as set forth in claim 19 wherein the interior of said transparent tubing is evacuated.

* * * * *